United States Patent [19]

Burton

[11] Patent Number: 4,687,155

[45] Date of Patent: Aug. 18, 1987

[54] TAPE MEASURE

[75] Inventor: Stan Burton, Rayleigh, England

[73] Assignee: Fisco Products Limited, Rayleigh, England

[21] Appl. No.: 836,636

[22] Filed: Mar. 5, 1986

[30] Foreign Application Priority Data

Mar. 7, 1985 [GB] United Kingdom ............... 8505847

[51] Int. Cl.$^4$ ............................................. B65H 75/48
[52] U.S. Cl. .................................. 242/107.3; 33/138
[58] Field of Search .................. 242/107.3, 107.4 C, 242/99, 156, 84.8; 33/138

[56] References Cited

U.S. PATENT DOCUMENTS

| 703,709 | 7/1902 | Olmstead | 242/107.3 |
| 2,586,386 | 2/1952 | Ryan . | |
| 2,904,282 | 9/1959 | Zelnick | 242/107 |
| 3,318,550 | 5/1967 | Quenot | 242/107.3 |
| 3,332,638 | 7/1967 | Jessup et al. | 242/107.3 |
| 3,381,916 | 5/1968 | Edgell | 242/107.3 |
| 3,463,416 | 8/1969 | Quenot | 242/84.8 |
| 3,517,780 | 6/1970 | Quenot | 188/83 |
| 3,610,548 | 10/1971 | Quenot | 242/107.3 |
| 3,744,733 | 7/1973 | Bennett | 242/107.3 |
| 3,830,443 | 8/1974 | Quenot | 242/99 |
| 4,194,703 | 3/1980 | Roe | 242/107.3 X |
| 4,350,313 | 9/1982 | Adomeit | 242/107.4 C |
| 4,489,902 | 12/1984 | Chaconas | 242/100.1 |

FOREIGN PATENT DOCUMENTS 1414616 11/1975 United Kingdom .

Primary Examiner—John M. Jillions
Attorney, Agent, or Firm—William R. Hinds

[57] ABSTRACT

A tape measure has a case, a measuring tape coilable therein, a return spring and a carrier turned by the spring to retract the measuring tape. Excessive speed of the carrier is reduced by rotational imbalance which induces wobble and so causes the rotating carrier to strike adjacent fixed structure and be frictionally retarded. The carrier has its radially inner and outer parts connected through a flexible link, and may include an eccentric drum for the blade to coil around.

20 Claims, 7 Drawing Figures

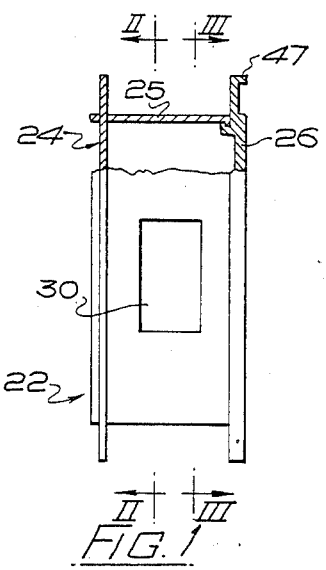
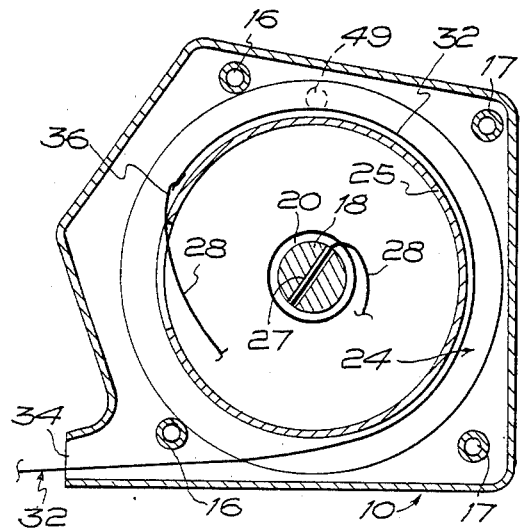
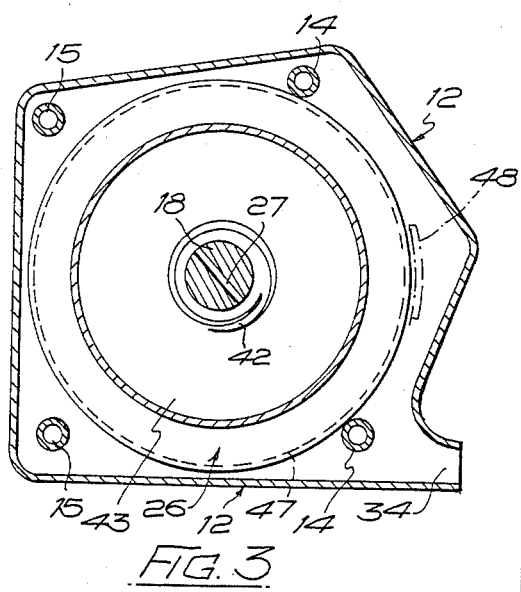
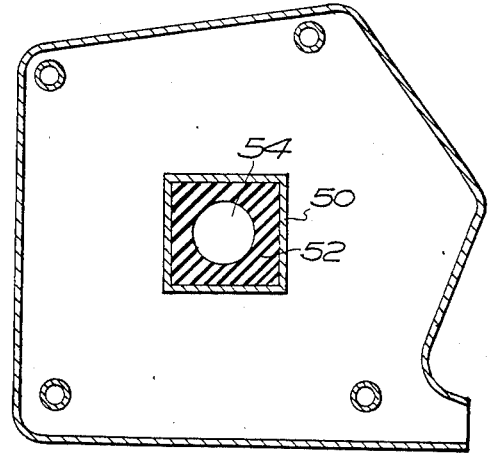

TAPE MEASURE

FIELD AND BACKGROUND OF THE INVENTION

This invention relates to tape measures of the kind having a case in which is accommodated a coilable blade, i.e. measuring tape, which can be drawn out for use, a rotary carrier such as a drum discs or a spool for coiling the tape upon, and a return spring to turn the carrier so as to retract the blade into the case. More specifically, the invention is concerned with such tapes where the return spring is powerful enough to retract the blade (which is normally a flexible metal strip) without manual assistance.

It is a long standing problem that such springs can retract the tape excessively fast and cause damage. The blade may whip about as it is being retracted, buckling itself and/or striking something. Damage may be caused when the motion of the blade is abruptly halted by the end hook striking the mouthpiece of the case. In extreme instances the end hook can be torn off. Excessively fast retraction is encouraged by a requirement that the spring be powerful enough to retract a blade which is not extending straight. It also tends to arise because a manufacturer will generally make a range of tape measures; the frictional drag on retraction will vary between one model in this range and another, and the manufacturer will wish to use a return spring capable of overcoming the greatest friction encountered.

There have been proposals to overcome or alleviate this problem. One is some kind of governor arrangement depending on bob weights which are centrifuged outwardly. This serves the purpose of retarding retraction, and indeed is apt to be too effective, so that retraction of the tape seems slow. However, it requires a complex and therefore expensive assembly of parts.

One manufacturer provides a rubber "bump stop" at the mouthpiece of the case. Another uses a rubber piece threaded onto the blade so that it comes between the end hook and the mouthpiece to lessen the impact. These techniques are of course alleviating the effects rather than dealing with the cause of them.

SUMMARY OF THE INVENTION

Broadly the present invention resides in utilising a wobble derived from rotational imbalance to bring about deceleration of the rotating carrier and such quantity of the blade as has already been wound thereon.

Accordingly, in a first aspect of the invention there is provided a tape measure of the kind specified at the beginning wherein the carrier is rotationally imbalanced, at least when the blade is partially wound thereon, and the carrier constructed and mounted such that when the return spring causes rotation at a sufficient speed during retraction of the blade the imbalance induces sufficient wobble of the rotary carrier for the carrier, or the part of the blade coiled thereon to make contact with adjacent structure and thereby be frictionally retarded. The wobble may be described as an oscillation out of the exact position of rotation. Preferably it is simply an oscillation radially relative to the axis around which the carrier and partly coiled blade is rotating. However, the carrier could also tilt, so that parts of it oscillate axially as well as radially.

The adjacent structure contacted by the carrier or blade coiled thereon will normally be fast with the case and may well be some part of the case itself.

When the carrier rotates slowly the extent of wobble will be small and will have little or no effect. The carrier will be able to accelerate. However, at some higher speed, the wobble will increase to the point where the rotating assembly (constituted by the carrier and such part of the blade as has already been wound thereon) contacts adjacent structure. The friction of this contact decelerates the rotating assembly. This of course diminishes the wobble so that the frictional contact disappears. The rotating assembly then continues moving and perhaps accelerates. It might well be that the wobble would appear and lead to deceleration more than once during retraction of the blade.

However, the speed at which the wobble becomes sufficient to induce deceleration is not constant. It progressively decreases as the blade is retracted, because of the increasing mass of the rotating assembly. For this reason it may very well be that most of the blade can be retracted without any deceleration of the carrier but the wobble becomes sufficient to cause deceleration as the last portion of the blade is retracted. This of course is highly desirable because it allows the blade to retract at a fairly fast speed and yet there is deceleration when it is required, shortly before impact of the end hook against the case. Of course, if the blade is pulled out only a short distance, the retraction of the blade may not build up sufficient speed for deceleration to occur, but in these circumstances it would not be needed.

Adequate rotational imbalance may well be achieved utilising the existing manner of tape measure construction. It is normal for the return spring to be reverse wound, that is to say the spring is coiled up in the opposite sense to its natural curl. An end portion of the spring extends through the carrier and because of its natural curl creates a small bulge which creates rotational imbalance. However with existing constructions there is normally no noticeable wobble, and such wobble as may occur, if any, has no observable effect because the carrier does not contact adjacent structure and is not frictionally retarded.

If sufficient imbalance does not occur in this way, then imbalance can of course be deliberately contrived by providing the rotary carrier with a suitably positioned thickened portion or cut-out or both.

The carrier may be journalled on a fixed pivot axis yet nevertheless be arranged to wobble during rotation. A preferred technique for achieving this is to have a flexible connection between a radially outer portion of the carrier and its radially inner portion which is journalled on the pivot axis. During rotation this flexible connection allows the outer portion and the coiled part of the blade to wobble relative to the inner portion. The wobble movement may in particular take the outer portion off center relative to the inner portion and pivot axis. The inner and outer portions and the flexible link between them may all be molded from plastic material.

As an alternative to this construction, the pivot on which the rotary carrier is journalled may itself be arranged to wobble. This might for instance be done if the pivot is not rigid with the case. It could be arranged that at least one end of the pivot is held in position by a rubber bush or some other elastic member serving to center it yet accommodate limited movement. Simply mounting the pivot axis with some radial free play might serve the purpose.

BRIEF DESCRIPTION OF THE DRAWINGS

FIG. 1 is an edge-on view of a spool;

FIG. 2 is a section through one component of the spool and the adjacent half of the case, on the line II—II of FIG. 1;

FIG. 3 is a section on the line III—III of FIG. 1;

FIG. 7 is a section of half of a case for a third embodiment.

DESCRIPTION OF PREFERRED EMBODIMENTS

Figure 4:
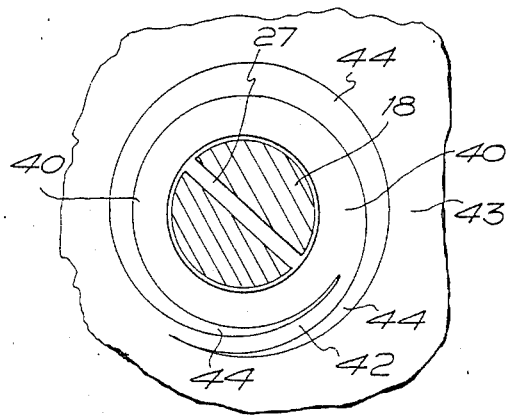
FIG. 4 is a larger scale detail of the central part of FIG. 3.

Referring to FIG. 1 to 4 of the drawings, a tape measure has a conventional case, consisting of two halves 10, 12 each of injection molded plastic material. These are shown in a simplified form in the drawings, with irrelevant features omitted. These two halves are joined together by the conventional technique of self-tappping screws passing through posts 14, 15 of one half and driven into corresponding posts 16, 17 of the other half or ultrasonically welded. Integral with the case half 12 is half of a pivot post 18 which on assembly of the case extends from side to side across it and fits into an annulus 20 molded on the case half 10.

A spool 22 consists of two parts 24, 26 each molded from plastic material and which snap fit together on assembly. The part 24 seen in FIG. 2 consists of the cylindrical drum 25 of the spool and one face. The other part 26 is the opposite face of the spool. The blade (measuring tape) coils onto this spool when retracted into the case. The part 26 rotates on the pivot post 18; the part 24 rotates around annulus 20.

As shown by FIG. 2 one end of a return spring 28 engages through a slit 27 in the pivot post 18. The spring forms a spiral (not shown) inside the spool. The other end portion of the return spring 28 extends through an aperture 30 in the spool. Outside the spool it is connected in conventional manner onto the blade 32 which can be drawn out through the mouth 34 of the case as illustrated in FIG. 2. The spring is wound in the opposite sense to its natural curl and in consequence the portion 36 lying on the outside of the spool forms a small bulge as shown. This bulge remains even when the blade is retracted and is coiled on top of the bulge. It thus serves to imbalance the spool.

As so far described the tape measure construction is conventional. However, as shown by FIG. 3 and the detail FIG. 4, the second part 26 of the spool is formed with an inner portion 40 which rotates on the pivot post 18, and a much larger surrounding outer portion 43. These are connected by a flexible link 42 which extends spirally from the inner portion 40 to the outer portion 43. The inner portion, the outer portion and the spiral link 42 are all integral with each other, being molded from plastic material. The gap 44 between the inner and outer portions and between them and the flexible link 42 could be a through hole. However, it is preferred that this gap is bridged by a thin web integral with the surrounding, thicker, plastic.

The effect of this flexible connection between the inner and outer portions of the part 26 is that the outer portion can be moved so as to become slightly eccentric relative to the inner portion 40 and the pivot post 18. Such movement into an eccentric condition is accommodated (and opposed) by the flexible link 42 and the thin web bridging the gap 44.

When the two parts of the spool are assembled together it is still possible for the outer portion of the part 26 to become eccentric. The movement is accommodated by some flexing of the part 24, and consequently the outer regions of this also become somewhat eccentric, as does any portion of the blade already wound onto the spool.

In use the blade can be drawn out normally by hand and when it is released the return spring 28 will (as normal) retract the blade, while turning the spool 22 so as to coil the blade onto the spool.

As the blade is retracted the mass and speed of the carrier and the coiled part of the blade progressively rise. Because it is not rotationally balanced this assembly wobbles and eventually the wobble becomes sufficiently great that the perimeter of the spool part 26 begins to strike against the posts 14. The perimeter of the part 26 is provided with a small annular lip 47 which increases the area of contact with the posts 14.

This contact with the surrounding structure decelerates the rotating assembly, whereupon the wobble diminishes and the blade continues to retract at a slower speed. The blade is five or eight meters long, and the wobble becomes sufficient to decelerate the blade when about one meter of it remains projecting from the case. This final meter retracts at a slower speed, so that the final impact of the end hook against the mouthpiece of the case is relatively gentle. As this final meter retracts the speed starts to accelerate again, but during retraction of this final meter or so of the blade, the speed does not build up very much.

As an alternative to relying on the parts 14 for frictional contact with the wobbling spool, a part-circular step 48 may be provided upstanding from on the inside face of the case half 12, as shown in phantom in FIG. 3.

Another possible modification is shown by FIG. 2. The spool part 24 may be provided with a hole 49 (shown in phantom) in its outer flange. A weight can be fitted to this hole, to increse the imbalance of the spool. A similar hole and weight might also be fitted to the spool part 26.

Figure 5:
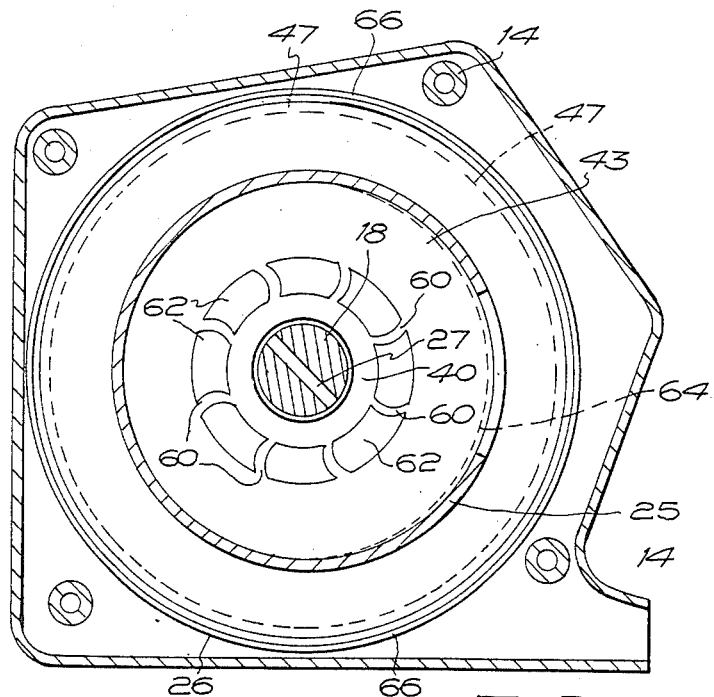
FIG. 5 is a section analogous to FIG. 3 and showing a second embodiment on a larger scale.

FIG. 5 shows another embodiment, in a sectional view similar to FIG. 3. The structure of the spool and case are basically the same, and like reference numerals are used where appropriate. The arrangement of the spring 28 and blade 32 is the same as for FIG. 1 to 4.

The inner portion 40 of the spool part 26 is joined to the surrounding outer portion 43 by eight fairly short arcuate ribs 60. These will flex to allow the outer portion 43 to move in any radial direction relative to the inner disc portion 40. Consequently this plurality of short ribs 60 permits the outer portion of the spool part 26 to wobble relative to the inner disc 40 and the pivot post 18. The inner and outer portions of the spool parts 24 are joined through arcuate ribs in exactly the same way. Since this arrangement of ribs is provided at both faces of the spool, wobble of the spool is essentially a radial oscillation.

The spaces 62 between the ribs 60 and the inner and outer portions 40, 43 may be through holes. Preferably they are each bridged by a thin web, thinner than the plastic of the ribs 60 and the inner and outer portions 40, 43, yet integral with them.

In order to increase the rotational imbalance, the spool is molded so that its drum 25 is slightly eccentric. The concentric position is indicated by the chain dotted circle 64. This enhances the imbalance created by the portion 36 of the return spring. We have found it unnecessary then to provide hole(s) 49 and weight(s) therein, although this could also be done.

Figure 6:
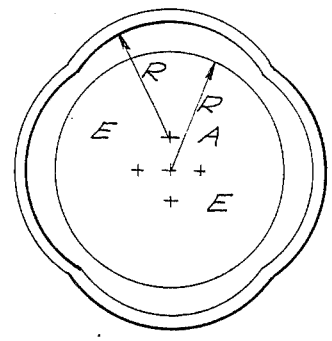
FIG. 6 is an exaggerated diagram illustrating features of FIG. 5.

Around the periphery of the spool there is a braking "ring" 66 which projects inwardly from the inside face of the case half 12. It is molded integrally with this. This "ring" 66 is not truly circular. It is built up from four arcs. As shown by the exaggerated diagram in FIG. 6, each arc has an internal radius R which is approximately the same as the radius of the spool. The arcs are centered on points E which are slightly spaced from the axis A of the spool.

Operation is essentially similar to that with FIGS. 1 to 4. As the blade is retracted by the return spring, rotational imbalance creates a wobble which is radial oscillation. This brings the flange 47 of the spool into contact with the braking "ring" 66, so that the spool is frictionally retarded.

The frictional contact could be with parts 14 positioned close to the spool, or could be with a circular ring. However, we have found that the "ring" 66 made up from arcs gives a more effective braking action. As the spool oscillates outwards it is thrown into these arcs, and a more positive braking action is achieved.

A braking "ring" of this type could be provided on both halves of the case, but we have found it effective to provide a braking "ring" on only one of the two halves.

FIG. 7 shows how the inside of a case half could be provided with a raised rib 50 to surround and locate a rubber bush 52, with a central hole 54. This hole could receive one end of a pivot post which was not rigid with the case. It would serve to hold the pivot post approximately in place, but would allow it to wobble about somewhat, against the resilience of the rubber. This form of mounting would be appropriate for a blade and spool provided as part of a pre-assembled cartridge, so that the pivot post is not integral with either half of the case. Obviously attachment of the post to the other case half, (i.e. the half opposite that in FIG. 7) should not be wholly rigid, so that wobble is possible.

I claim:

1. In a tape measure of the kind having a case, a coilable measuring blade, a rotary carrier for coiling the blade upon, pivot means for journalling the carrier within the case, and a return spring to turn the carrier and retract the blade into the case by winding the blade onto the carrier, so that an assembly consisting of the carrier and a part of the blade wound thereon is rotating in the case during retraction of the blade, the improvement which comprises means to cause rotational unbalance of the said rotating assembly of the carrier and part of the blade wound thereon, structure within the case adjacent the carrier, said carrier being constructed and journalled by said pivot means such as to permit at least part of said assembly to wobble relative to said structure during rotation of said assembly, whereby when said return spring imparts sufficient speed to said rotating assembly during retraction of the blade, the rotational unbalance of said assembly induces said wobble, such that the assembly makes contact with said adjacent structure, and is thereby frictionally retarded.

2. A tape measure according to claim 1 wherein said carrier comprises a radially inner part journalled by said pivot means, a radially outer part, and a flexible link connecting said inner and outer parts, and allowing the outer part of the carrier, with the part of the blade coiled thereon, to wobble relative to the inner part.

3. A tape measure according to claim 2 wherein said pivot means comprises a pivot and an elastic member supporting said pivot relative to said case, allowing said pivot to wobble.

4. A tape measure according to claim 2, wherein said flexible link extends along a curved path between said inner and outer parts.

5. A tape measure according to claim 4, wherein said flexible link extends as part of a spiral between said inner and outer parts.

6. A tape measure according to claim 4 wherein the flexible link comprises a plurality of arcuate ribs extending between said inner and outer parts.

7. A tape measure according to claim 6 wherein the rotary carrier comprises a drum for the blade to coil onto, and each side face of said drum comprises radially inner and outer parts connected by said plurality of arcuate ribs.

8. A tape measure according to claim 2, wherein said inner and outer parts, and said flexible link connecting said parts are molded integrally from plastic material.

9. A tape measure according to claim 1 wherein the means to cause rotational unbalance of the rotating assembly comprises a bulge of the return spring, over which the blade coils.

10. A tape measure according to claim 1 wherein the rotary carrier comprises a drum for the blade to coil onto, which drum is eccentric relative to the axis of the pivot means, thereby to create rotational unbalance of the rotating assembly.

11. A tape measure according to claim 1 wherein a periphery of the carrier is surrounded by a ring, to be contacted by the carrier, which ring is formed from arcs having substantially the same radius as the periphery of the carrier.

12. A tape measure according to claim 2 wherein a periphery of the carrier is surrounded by a ring, to be contacted by the carrier, which ring is formed from arcs having substantially the same radius as the periphery of the carrier.

13. A tape measure according to claim 3 wherein a periphery of the carrier is surrounded by a ring, to be contacted by the carrier, which ring is formed from arcs having substantially the same radius as the periphery of the carrier.

14. A tape measure according to claim 4 wherein a periphery of the carrier is surrounded by a ring, to be contacted by the carrier, which ring is formed from arcs having substantially the same radius as the periphery of the carrier.

15. A tape measure according to claim 5 wherein a periphery of the carrier is surrounded by a ring, to be contacted by the carrier, which ring is formed from arcs having substantially the same radius as the periphery of the carrier.

16. A tape measure according to claim 6 wherein a periphery of the carrier is surrounded by a ring, to be contacted by the carrier, which ring is formed from arcs having substantially the same radius as the periphery of the carrier.

17. A tape measure according to claim 7 wherein a periphery of the carrier is surrounded by a ring, to be contacted by the carrier, which ring is formed from arcs having substantially the same radius as the periphery of the carrier.

18. A tape measure according to claim 8 wherein a periphery of the carrier is surrounded by a ring, to be contacted by the carrier, which ring is formed from arcs having substantially the same radius as the periphery of the carrier.

19. A tape measure according to claim 9 wherein a periphery of the carrier is surrounded by a ring, to be contacted by the carrier, which ring is formed from arcs having substantially the same radius as the periphery of the carrier.

20. In a tape measure of the kind having a case, a coilable measuring blade, a rotary carrier for carrying the coilable blade, the carrier being rotatably mounted within the case, and a return spring to turn the carrier and retract the blade into the case by winding the blade onto the carrier, so that an assembly consisting of the carrier and a part of the blade wound thereon is rotating in the case during retraction of the blade, the improvement comprising means to cause rotational unbalance of the said rotating assembly of the carrier and part of the blade wound thereon, structure within the case adjacent the carrier, means permitting wobbling movement of at least part of said assembly relative to said structure and in directions generally normal to a rotational axis during rotation of said assembly, such that when said return spring imparts sufficient speed to said rotating assembly during retraction of the blade, the rotational unbalance of said assembly induces wobble of the assembly, such that the assembly makes contact with said adjacent structure, and is thereby frictionally retarded.

* * * * *